United States Patent
Angelin

(10) Patent No.: US 10,574,149 B2
(45) Date of Patent: Feb. 25, 2020

(54) CONVERTER CIRCUIT AND CORRESPONDING METHOD

(71) Applicant: OSRAM GmbH, Munich (DE)

(72) Inventor: Francesco Angelin, Mogliano Veneto (IT)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 15/992,215

(22) Filed: May 30, 2018

(65) Prior Publication Data
US 2018/0351461 A1   Dec. 6, 2018

(30) Foreign Application Priority Data
Jun. 5, 2017 (IT) .......................... 102017000060981

(51) Int. Cl.
*H02M 1/34* (2007.01)
*H02M 3/337* (2006.01)
*H02H 7/125* (2006.01)

(52) U.S. Cl.
CPC .......... *H02M 3/3376* (2013.01); *H02H 7/125* (2013.01); *H02M 1/34* (2013.01)

(58) Field of Classification Search
CPC ............. H02M 3/335; H02M 3/33507; H02M 3/33515; H02M 3/33523; H02M 3/33538; H02M 3/33546; H02M 3/33553; H02M 3/33569; H02M 3/337; H02M 3/3376; H02M 3/338; H02M 3/3382; H02M 3/3385; H02M 3/3387; H02M 1/34; H02M 2001/342; H02M 2001/344; H02M 2001/346; H02M 2001/348; H02H 7/125
See application file for complete search history.

(56) References Cited

U.S. PATENT DOCUMENTS

| 4,245,288 A | 1/1981 | McLyman |
| 4,605,999 A * | 8/1986 | Bowman ............... H02M 3/338 323/248 |

(Continued)

FOREIGN PATENT DOCUMENTS

| JP | S53104806 A | 9/1978 |
| JP | S63186561 A | 8/1988 |

OTHER PUBLICATIONS

Italian Search Report based on application No. 102017000060981 (8 pages) dated Feb. 22, 2018 (Reference Purpose Only).

*Primary Examiner* — Gary L Laxton
*Assistant Examiner* — Ivan Laboy
(74) *Attorney, Agent, or Firm* — Viering, Jentschura & Partner MBB

(57) ABSTRACT

A converter circuit, comprising: a supply node and an output node of the converter circuit, a half-bridge arrangement coupled to the supply node and including a pair of electronic switches alternatively switchable between conductive and non-conductive states with a drive node therebetween, a transformer with a primary winding driven by the drive node and a secondary winding including two portions with a center tap node coupled to the output node of the converter circuit and an inductive component. The inductive component including two magnetically coupled winding halves with a respective center tap node, the inductive component being coupled to the ends of the secondary winding of the transformer with the respective center tap node coupled to the output node of the converter circuit.

12 Claims, 3 Drawing Sheets

(56) References Cited

U.S. PATENT DOCUMENTS

| | | | | |
|---|---|---|---|---|
| 5,434,768 A | * | 7/1995 | Jitaru | H02M 3/33569 |
| | | | | 363/131 |
| 5,621,625 A | * | 4/1997 | Bang | H02M 1/32 |
| | | | | 363/21.1 |
| 6,349,044 B1 | * | 2/2002 | Canales-Abarca | H02M 1/34 |
| | | | | 363/134 |
| 7,187,531 B1 | | 3/2007 | Chen | |
| 7,313,003 B2 | | 12/2007 | Nakahori et al. | |
| 7,471,524 B1 | * | 12/2008 | Batarseh | H02M 3/33592 |
| | | | | 363/127 |
| 2002/0136033 A1 | * | 9/2002 | Hirokawa | H02M 1/34 |
| | | | | 363/21.01 |
| 2003/0142513 A1 | * | 7/2003 | Vinciarelli | H02J 1/102 |
| | | | | 363/17 |
| 2007/0025125 A1 | * | 2/2007 | Nakahori | H02M 1/32 |
| | | | | 363/56.02 |
| 2010/0321960 A1 | * | 12/2010 | Nakahori | H01F 27/2804 |
| | | | | 363/21.04 |
| 2012/0294047 A1 | * | 11/2012 | Wang | H02M 3/33576 |
| | | | | 363/21.02 |
| 2013/0272031 A1 | * | 10/2013 | Hosotani | H02M 3/33569 |
| | | | | 363/16 |
| 2016/0352235 A1 | * | 12/2016 | Imai | H02M 3/33569 |

* cited by examiner

Prior Art

CONVERTER CIRCUIT AND CORRESPONDING METHOD

CROSS-REFERENCE TO RELATED APPLICATION

This application claims priority to Italian Patent Application Serial No.: 102017000060981, which was filed Jun. 5, 2017, and is incorporated herein by reference in its entirety and for all reasons.

TECHNICAL FIELD

The description relates to converter circuits.

One or more embodiments may be applied, for example, in converter circuits for powering lighting devices: however, the reference to this possible field of application is purely exemplary and is not to be taken in a restrictive sense of the embodiments.

BACKGROUND

Various types of converter circuit, for example, LLC converters (i.e. inductive-inductive-capacitive), use center-tapped transformers.

In the practical implementation of solutions of this type, various mechanical conditions come into play, related to the realization of the winding and various aspects of magnetic nature, thus making it difficult to achieve a perfect coupling. For example, non-coupling phenomena (leakage) may arise, which may be addressed using rectifiers operating at high voltage and/or "snubber" circuits, solutions that, however, may significantly affect the structure and behavior of the circuit.

SUMMARY

It is therefore desirable to have improved solutions capable of addressing the aspect of imperfect coupling between the two windings on the secondary side of a transformer (as used, for example, in an LLC converter). For example, it is desirable to provide solutions capable of reducing phenomena of high-frequency oscillation (ringing) and/or voltage spikes, which may arise when the rectifier is switched off.

One or more embodiments aim to contribute to providing improved solutions of this nature.

According to one or more embodiments, this object is achieved thanks to a converter circuit having the characteristics referred to in the claims below.

One or more embodiments may concern a corresponding method.

The claims form an integral part of the technical description provided here in relation to the embodiments.

One or more embodiments may envisage using a transformer operating in conjunction with a capacitive coupling and a charge pump.

One or more embodiments may use at least one auxiliary inductive component able to recover the "uncoupled" energy capable of inducing the oscillation (ringing) and spike phenomena mentioned previously.

In one or more embodiments, it is possible to use a damping resistor in order to further reduce the high-frequency oscillation.

One or more embodiments have a reduced impact on the overall structure of the converter circuit being, however, able to provide significant improvements in terms of efficiency without requiring oversizing of components.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DETAILED DESCRIPTION

The following description illustrates various specific details, in order to provide a thorough understanding of various embodiment examples. The embodiments may be obtained without one or more of the specific details, or with other methods, components, materials, etc. In other cases, known structures, materials or operations are not illustrated or described in detail so that the various aspects of the embodiments and not rendered unclear.

The word "exemplary" is used herein to mean "serving as an example, instance, or illustration". Any embodiment or design described herein as "exemplary" is not necessarily to be construed as preferred or advantageous over other embodiments or designs.

The reference to "an embodiment" in the context of the present description indicates that a particular configuration, structure or characteristic described in relation to the embodiment is included in at least one embodiment. Thus, sentences such as "in an embodiment", which may be present at various points in the present description, do not necessarily refer to exactly the same embodiment. Moreover, particular configurations, structures or characteristics may be combined in any convenient way in one or more embodiments.

The references used here are provided simply for convenience and, therefore, do not define the field of protection or scope of the embodiments.

Figure 1:
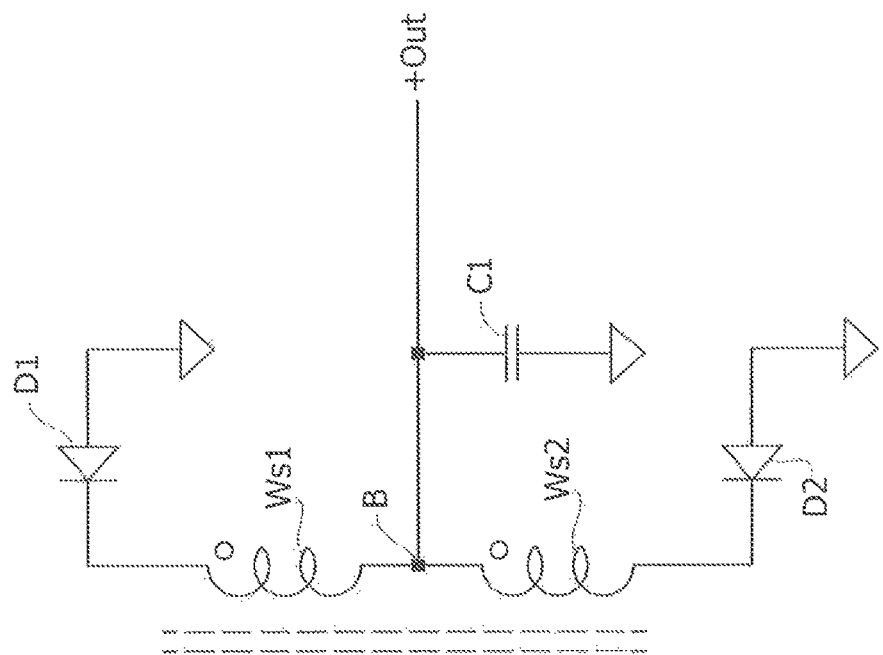
FIG. 1 is a circuit diagram of an LLC-type converter circuit.
Figure 1:
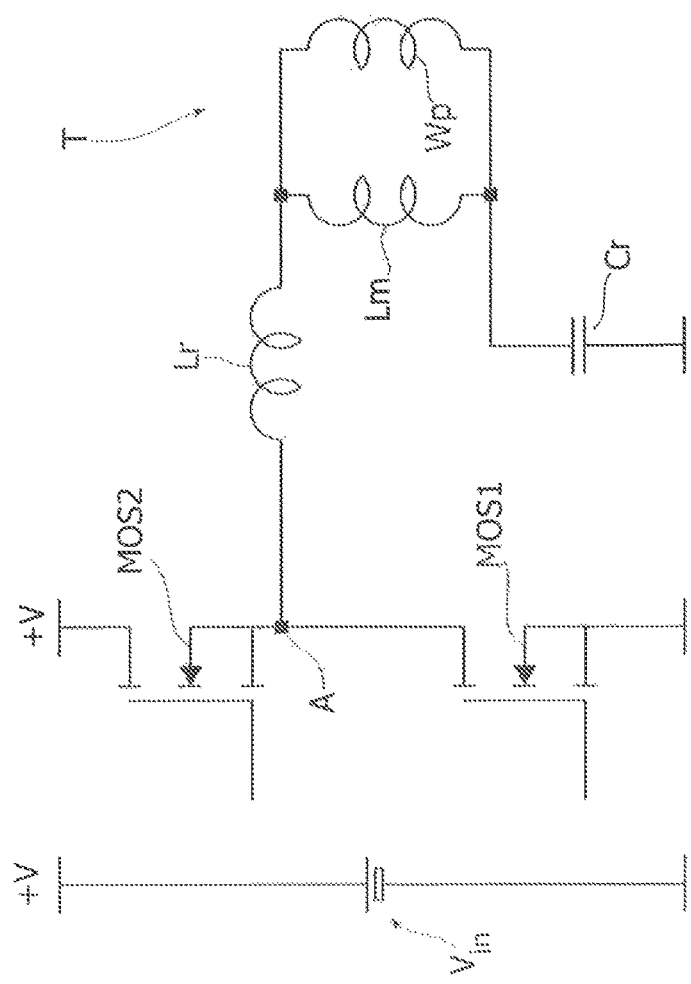

The diagram in FIG. 1 illustrates the ideal structure of a converter such as, for example, a converter of the LLC-type usable, for example, for powering lighting devices.

As already mentioned the reference to this possible field of application is purely exemplary and is not to be taken in a limiting sense of the embodiments.

Furthermore, while—for simplicity and clarity of illustration—the continuation of the present detailed description will refer to an LLC converter, it will be appreciated that one or more embodiments may be applied to different types of converter structures, exposed (e.g. at the secondary winding level) to critical aspects substantially similar to those discussed below.

In essential terms, a converter structure as exemplified in FIG. 1 comprises a half-bridge structure with two input switches (e.g. two electronic switches, such as MOS transistors, indicated with MOS1, MOS2) arranged with the respective current paths or channels (source-drain, in the case of field effect transistors such as MOSFET transistors), in series with each other. The half-bridge structure has a supply node +V to which a supply voltage $V_{in}$ may be applied, and a node A between the two switches.

The electronic switches MOS1, MOS2 are designed to be alternatively taken into a conducting and non-conducting state and to drive the primary side of a transformer T via the node A. The transformer T comprises a primary winding Wp and a secondary winding comprising two portions Ws1, Ws2, electrically in series with each other and having an intermediate node (the "center tap node" and indicated with B in the figures). The node B is able to supply an output current on a terminal or output node +Out, e.g. at the ends of an output capacitor C1.

The inductor Lr (interposed between the node A and the primary winding Wp of the transformer T) and the inductor Lm (represented as coupled to the ends of the primary winding Wp, i.e. parallel to it) represent, respectively, the dispersed inductance (leakage) and the magnetization inductance of the transformer T.

The reference Cr indicates an "external" capacitor interposed between the terminal of the primary winding of the transformer T opposite to that of the dispersed inductance Lr and the switch MOS 1, intended to form the oscillating circuit (resonant tank) at the base of the operation of the converter.

The references D1, D2 indicate two diodes interposed, between the ground and the first portion Ws1 of the secondary winding of the transformer T, and between the ground and the portion Ws2 of the secondary winding of the transformer T, respectively. The diodes D1, D2 are represented by their anodes connected to ground and their cathodes connected to the respective portions of the secondary winding of the transformer T.

The representation of FIG. 1 corresponds to the transformer model currently known as "cantilever", which allows representation of the total dispersed inductance between the primary and secondary windings of the transformer through the single inductor Lr which, together with the capacitor Cr, forms the resonant circuit or resonant tank of the converter.

For the sake of completeness, it is also noted that a converter, as exemplified in the figure, is essentially configured as an isolated converter, i.e. as a double bipole capable of presenting a ground of the primary side (which may be controlled by the switch MOS1 and the capacitor Cr, here exemplified as connected to each other) different from the ground of the secondary side, here expressly represented.

FIG. 1 presents an ideal model of the converter, in which obtainment of a perfect coupling (K=1) is assumed between the two portions or halves Ws1 and Ws2 of the secondary winding of the transformer T.

Therefore, this ideal model assumes that, as a non-limiting example:
  the current that flows in Ws1 may be instantly diverted to Ws2 and vice versa,
  the voltage at the ends of Ws1 is exactly a copy of that at the ends of Ws2, which means considering Ws1 and Ws2 as two essentially identical halves from a magnetic point of view, with the only difference given by the different electrical connection, and
  precisely as a function of this ideal identity, each of the diodes D1, D2 has a voltage at its ends exactly equal to twice the voltage at the ends of each winding portion when the other diode is conducting, that is to say, a value equal to double the output voltage.

In the practical embodiment of the model exemplified in FIG. 1, however, it has been observed that the perfect magnetic coupling between the two portions Ws1 and Ws2 corresponds (only) to an ideal model. Therefore, if in a converter—as shown in FIG. 1—a relatively loose coupling between the primary side and the secondary side of the transformer T may represent a not particularly critical aspect, if not desired, the same does not apply when considering the two portions or halves Ws1, Ws2 of the secondary winding, with the center tap node coupled to the output terminal of the circuit.

In practice it has been observed that, e.g. with the secondary winding of the transformer T wound on different sections of the winding formation element (coil former)—as may occur, as a non-limiting example, in a three-chamber transformer—the two portions of the secondary windings are located on the outer sides with the primary winding interposed between them, which makes it difficult to achieve the ideal model shown in FIG. 1.

Figure 2:
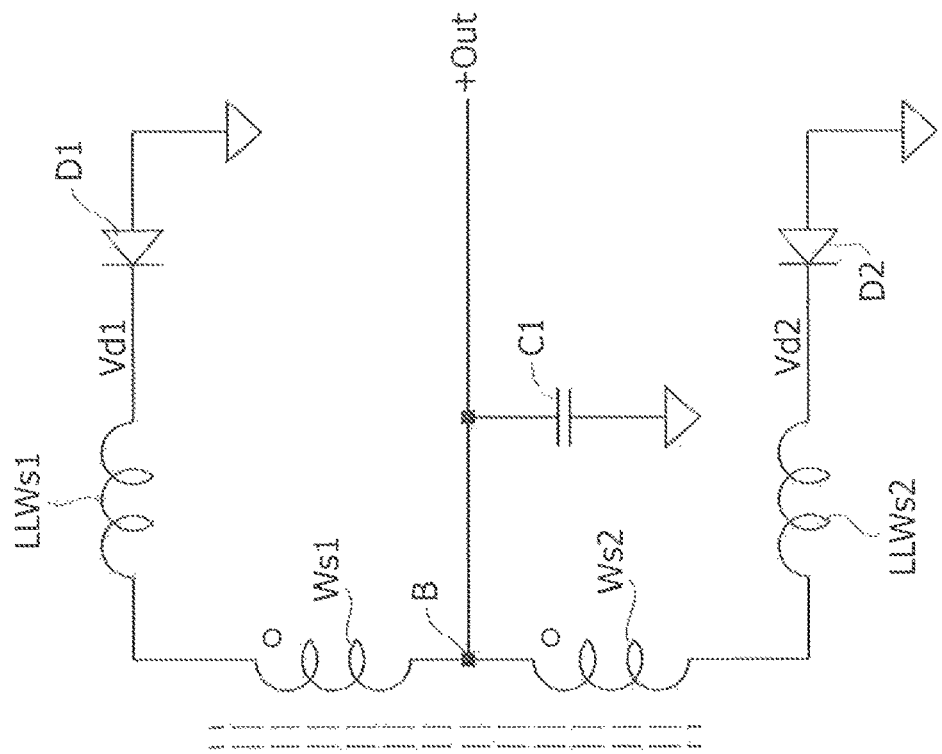
FIG. 2 exemplifies some aspects related to the practical implementation of such a converter.
Figure 2:
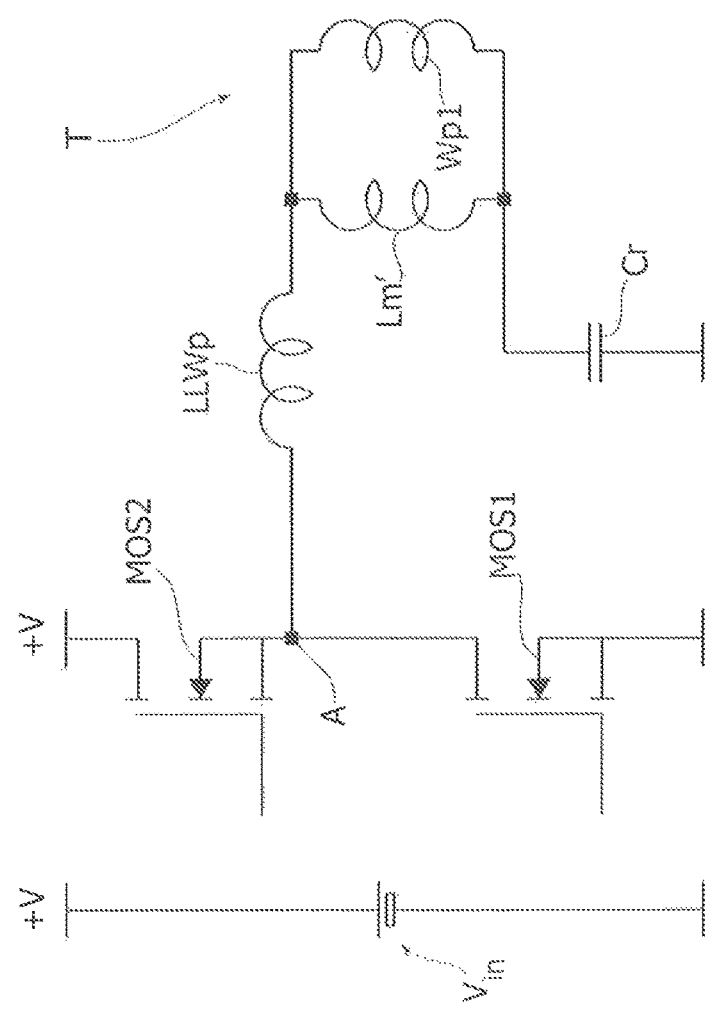

It has been observed that the practical embodiment of the exemplary ideal model in FIG. 1 ends up corresponding to the circuit configuration exemplified in FIG. 2, where elements/components identical to those already presented in relation to FIG. 1 are indicated with the same references, without repeating the corresponding description for the sake of brevity.

As represented in FIG. 2, in the practical embodiment of the diagram of FIG. 1, two further dispersed inductances, LLWs1 and LLWs2 may come into play, which may be seen as connected in series, respectively, to either of the two portions Ws1, Ws2 of the secondary winding of the transformer T. The two diodes D1, D2 are, therefore, exposed to respective voltages Vd1 and Vd2 (referred to ground), different from those present at the ends of the two portions Ws1, Ws2 of the secondary winding of the transformer T in the ideal model shown in FIG. 1.

Furthermore, the dispersed inductance visible at the primary side of the transformer T assumes a value LLWp with the magnetization inductance at a value Lm', whereby—that which in the ideal model of FIG. 1 is the dispersed inductance Lr on the primary side of the transformer—is actually given by the dispersed inductance of the primary winding, indicated by LLWp in the diagram of FIG. 2, plus the dispersed inductance on the secondary side multiplied by the square of the turns ratio of the transformer T.

This total value of the dispersed inductance Lr is that which determines the characteristics of the resonant circuit (resonant tank).

The dispersed inductances on the secondary side indicated by LLWs1, LLWs2 in FIG. 2, exemplify the fact that the coupling between the two portions of the secondary winding with center tap node B is not perfect.

From a physical point of view this means that:
  a certain amount of magnetic energy in one of the winding portions cannot be recovered from the other,
  the current that flows through Ws1 cannot be instantaneously diverted to Ws2 and vice versa,
  the voltage at the ends of one half of the (secondary) winding is not an exact copy of that at the ends of the other half, so that the two winding portions do not express exactly the same magnetic path: the transformer T, therefore, tends to behave essentially as formed by two different transformers with the same primary winding,
  consequently each of the output diodes D1, D2 is exposed to a voltage that may be greater than twice the output voltage, as would occur according to the ideal model.

The fact that the coupling between the two portions or halves Ws1, Ws2 is not perfect (situation modeled in FIG. 2 through the inductances LLWs1 and LLWs2) may be particularly relevant in the case in which the wire of the winding is distributed into two sections that do not occupy the same space, as may be the case (already mentioned above) of a coil former organized into three chambers or when the primary winding Wp1 is interposed (interleaved) in a concentric structure between the two portions of the secondary winding.

Failure to achieve perfect coupling between the two portions or halves of the secondary winding of the transformer T may have various negative effects.

As a non-limiting example, when (during a half-cycle of the switching of the converter) the current in the load flows through a portion of the secondary winding while the other portion is an open circuit, there is no current flowing through it, so that there is a voltage drop at the ends of e.g. LLWs1, but not at the ends of LLWs2 or vice versa.

The result is that the electromotive force (EMF) on e.g. Ws1 is found to have an overlapped ripple that is the same as Ws2, but that is not absorbed by LLWs2 so that the peak voltage at the ends of the diode D2 becomes higher than twice the output voltage.

The magnitude of this voltage increase is related to the relationship between LLWp and LLWs, which gives rise to a sort of voltage divider, with an exaltation effect (boost) due to the magnetization inductance Lm', with this behavior described with reference to one of the halves of the secondary winding of the transformer T intended to be reproduced symmetrically when the other half is conductive.

The two rectifier diodes D1 and D2 are therefore exposed to an (inverse) voltage greater than that foreseen in the "ideal" operation of the transformer, with perfect coupling. The overlapped ripple is—in practice—a half sine wave at the resonance frequency LLC, with a repeating factor equal to the switching period.

Again, when the polarity of the transformer is reversed before the current of the rectifier has naturally reached zero (that is, when the converter operates at a higher frequency of resonance), the current in the diode that—at the moment—is conducting, goes down very quickly. This may be the basis of a high amplitude oscillation (ringing) at the ends of the diode due to the resonance of the set formed by the inductance LLWs and the parasitic capacitance of the cathode node (i.e. the one on which the voltage Vd1 or the voltage Vd2 is present).

Due to the inductance dispersed on the other branch of the circuit, this oscillation effect is not "clamped" at the level of the output voltage from the other diode, so that the amplitude of this oscillation may be practically almost uncontrolled.

Under certain conditions, this high-frequency oscillation may result in breakdown or in an avalanche phenomenon in the rectifier.

As a non-limiting example (if we want to cite quantitative values, which of course do not have a limiting effect on the embodiments), we may observe the occurrence of voltages in the order of 110 V when the converter is envisaged to operate at 80 V, with the oscillation (ringing) that may have a frequency of 8 MHz and a duration of 1 microsecond. All this also being possible to find the presence of the ripple at lower frequencies with amplitudes in the order of 20 V peak-to-peak.

Under these conditions, the rectifier is exposed to significant stresses, which can lead to its oversizing at the project level, in order to avoid the risk of avalanche phenomena and of increased power dissipation.

It may also be observed that the high-frequency oscillation also has harmful effects with regard to the performances in terms of electromagnetic interference (EMI), which may give rise to common mode noise.

Figure 3:
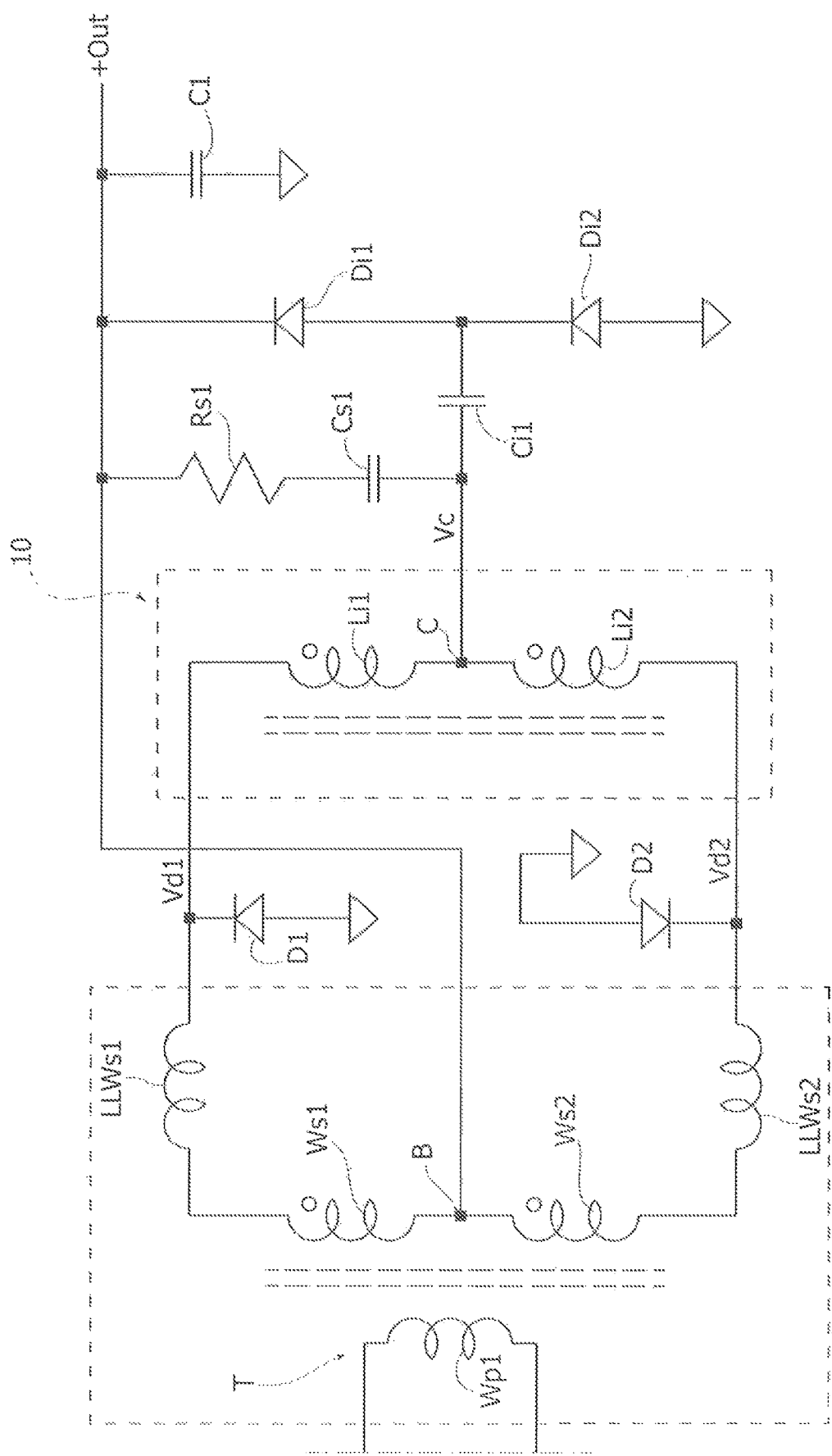
FIG. 3 is an exemplary circuit diagram of embodiments.

These orders of problems may be addressed in one or more embodiments as exemplified in FIG. 3.

Once again, elements/components already introduced by previously discussing FIGS. 1 and 2 are indicated in FIG. 3 with the same references, without repeating the corresponding detailed description.

In this regard, it will also be noted that, again for simplicity and clarity of representation, in FIG. 3 the portion of the converter that drives the primary winding Wp1 of the transformer T is not visible.

One or more embodiments may aim at remedying the high-frequency oscillation (ringing) that may occur at each switching period at the ends of each rectifier (therefore, twice for each operating cycle of the converter).

One or more embodiments may aim to address the aspect of the overlapped ripple that derives from the effect of the divider described above.

It has, moreover, been observed that the aforesaid oscillation or ringing may be expected, as far as the operation of the converter is concerned, as a more important aspect than the ripple.

One or more embodiments, as exemplified in FIG. 3, envisage using an additional magnetic component 10, which may be seen as ideally representative of a sort of auxiliary transformer for compensating the dispersed inductance.

In one or more embodiments, the component 10 may comprise two inductive windings Li1, Li2 with a center tap node C interposed between them and coupled to the output node +Out.

The inductive windings Li1, Li2 may be made with a perfect coupling so as to remedy the lower level of coupling between the two portions Ws1, Ws2 of the secondary winding of the "main" transformer indicated by T.

The component 10 may be seen as a sort of transformer arranged in parallel with the secondary winding of the transformer T (i.e. at the terminals—here the cathodes—of the diodes D1, D2 on which the signal Vd1, Vd2 is present) in such a way as to divert the energy in the dispersed inductance LLWs1, LLWs2 directly to the main output Out of the converter, so as to achieve a "clamping" action of the voltage at a safe level for the rectifier.

It has been observed that the use of the component 10 allows both problems outlined above (oscillation or ringing and ripple) to be addressed.

If it is admissible that the windings Li1, Li2 of the component 10 bear the same current as the main transformer T, this may take place using the component 10 even without additional components, e.g. envisaging that the respective center tap node C is coupled to the output node +Out of the converter circuit by means of a direct connection, without intermediate elements.

Given that in some applications this solution may be impractical and unattractive, in one or more embodiments the node C (which is not connected continuously to any power supply line or rail) may be coupled to the output node +Out with an alternating coupling, e.g. capacitive, in order to divert only that portion of energy that would otherwise trigger the oscillation phenomenon.

In one or more embodiments, this alternating coupling may comprise a (first) capacitor Ci1 coupled between the center tap node C of the component 10 and the output Out (for example, by means of a diode half-bridge Di1, Di2, which will be discussed below).

The capacitance value of Ci1 may be chosen to be sufficiently high to keep the voltage—at its ends—stable during charge injection.

In one or more embodiments, it is possible to provide a (second) capacitor Cs1 (for example, with a smaller capacitance value than Ci1) intended to be charged and discharged at each switching cycle, as a non-limiting example, at a frequency equal to twice the frequency of the converter. In one or more embodiments, the coupling of the center tap node C to the output Out through the capacitor Cs1 may take place through a resistor Rs1 placed in series with the capacitor Cs1.

With the node C (center tap node of the component 10, on which there is a signal Vc) connected directly to the output terminal +Out, both the voltages Vd1, Vd2 are subjected to a practically perfect clamping, the component 10 being arranged exactly parallel to the secondary winding of transformer T.

As mentioned, this solution may, however, be unpractical as a function of the high amount of current flowing through the component 10.

By adopting the exemplified solution of FIG. 3 it is possible to make the capacitor Cs1 deviate (only) the short energy pulse coming from the inductors LLWs1, LLWs2 through the resistor Rs1, with a damping effect of the oscillation of the added components with respect to the basic structure of FIGS. 1 and 2.

The effect of the capacitor Cs1 is ideally that of keeping the node C "unreleased" or locked for a short period of time, allowing the pulse of current to flow through the component 10 from one half to the other of the two portions or halves Li1, Li2 of the component 10.

The capacitor Cs1 is charged and discharged at a frequency equal to twice the switching frequency of the converter.

One or more embodiments may take into account the fact that increasing the value of this capacitor may lead to having a certain amount of load current flowing into the component 10 due to the overlapped ripple.

To this end, one or more embodiments may envisage the second clamping network comprising the two diodes Di1, Di2 arranged in series, with the intermediate node between the diodes connected to the capacitor Ci1 on the side thereof opposite to the node C.

As exemplified in FIG. 3, connection in series of the two diodes Di1, Di2 envisages an identical orientation of the two diodes with the anode of Di2 connected to ground and the cathode of Di1 connected to the output terminal +Out.

This clamping network acts until the signal Vc on the node C reduces to a value lower than Vout, that is, until the peak-to-peak ripple superimposed on Vd1, Vd2 is less than twice the output voltage.

The tests carried out with reference to the configuration of FIG. 3 confirm that one or more embodiments are able to achieve a clamping action of the voltage on the rectifier at a reasonable level, and to contain the high-frequency oscillation in an excellent manner.

All this being able to use e.g. 80 V diodes instead of 120 V diodes (with a positive effect in terms of costs and performance) being also able to avoid the use of dissipative snubber circuits, resulting in improved efficiency.

Although without wanting to be restricted to any theory in this regard, it is possible to hypothesize that the fact of choosing a sufficiently high value for the capacitor Ci1 may cause the voltage at the ends of the capacitor to be nearly invariable during the charge transfer, so that in practice, the system behaves like a charge pump.

Possible values for the capacitor Ci1 are in the order of microFarad units, while for the capacitor Cs1, possible values are in the field of nanoFarad units.

One or more embodiments, therefore, allow a reduction in the voltage load applied on the rectifiers (for example, N-type MOSFET diodes or transistors) to be achieved, with a significant reduction in the high-frequency oscillation and beneficial effects, in particular, with respect to the electromagnetic interference.

In one or more embodiments, the component 10 may also be used to derive auxiliary voltages that may be used on the secondary side without having to provide tap terminals on the secondary winding of the transformer T for this purpose.

As a non-limiting example, in one or more embodiments, other windings magnetically coupled to Li1, Li2 may be used to derive additional outputs at a different voltages from the main output (which in one case—as exemplified here—may be equal to about 24.2 V), for example, for auxiliary voltages that may be used to operate a power supply.

This solution may be useful, for example, when it is not physically possible to wind further windings on the main transformer T, or when the voltages derived from these windings would have too much overlapped ripple, or again to overcome certain limitations in terms of turns ratio.

With regard to this last aspect, the fact of having, for example, 24 V on (only) four turns (i.e. 6 V/turn) would allow only voltages corresponding to multiples of 6 V from the main transformer to be obtained. With an inductive component 10 with, for example, about one hundred turns, it is possible to obtain voltages with a "granularity" of 0.25 V/turn).

In one or more embodiments, a converter circuit may comprise:
  a power supply node (+V—see, for example, FIGS. 1 and 2) and an output node (+Out) of the converter circuit,
  a half-bridge arrangement coupled to the supply node and including a pair of electronic switches (MOS1, MOS2—see, for example, FIGS. 1 and 2 again) alternatively switchable between conductive and non-conductive states with a drive node (e.g. A) therebetween,
  a transformer (e.g. T) with a primary winding (e.g. Wp1) driven by the drive node and a secondary winding including two portions (e.g. Ws1, Ws2) with a center tap node (e.g. B) coupled to the output node of the converter circuit,
  an inductive component (e.g. 10) including two magnetically (well) coupled winding halves (e.g. Li1, Li2) with a respective center tap node (e.g. C), the inductive component being coupled to ends of the secondary winding of the transformer, with the respective center tap node coupled to the output node of the converter circuit.

In one or more embodiments, the respective center tap node of the inductive component may be coupled to the output node of the converter circuit via a direct connection or via an alternating connection, e.g. capacitively coupled (e.g. Ci1, Cs1).

In one or more embodiments, the respective center tap node of the inductive component may be coupled to the output node of the converter circuit via a diode clamping arrangement (e.g., Di1, Di2).

In one or more embodiments, the clamping arrangement may include a series arrangement of two diodes (e.g. Di1, Di2) between the output node of the converter circuit and ground with an intermediate node between the two diodes coupled to the respective center tap node of the inductive component.

In one or more embodiments, the intermediate node between the two diodes may be coupled with capacitive coupling to the respective center tap node of the inductive component.

One or more embodiments may comprise an RC network (e.g. Rs1, Cs1) interposed between the respective center tap node of the inductive component and the output node of the converter circuit.

In one or more embodiments, the RC network may comprise a resistor and a capacitor arranged in series with each other.

In one or more embodiments, the inductive component may include at least one further winding magnetically coupled to the two winding halves, the further winding adapted to provide a further converter output.

A method according to one or more embodiments may comprise the act of providing a converter circuit with:
- a supply node and an output node of the converter circuit,
- a half-bridge arrangement coupled to the supply node and including a pair of electronic switches alternatively switchable between conductive and non-conductive states with a drive node therebetween,
- a transformer with a primary winding driven by the drive node and a secondary winding including two portions with a center tap node coupled to the output node of the converter circuit, The method may also include the act of providing an inductive component including two magnetically coupled winding halves with a respective center tap node, the inductive component coupled to the ends of the secondary winding of the transformer with the respective center tap node coupled to the output node of the converter circuit.

Without prejudice to the underlying principles of the description, the details of construction and the embodiments may vary, even significantly, with respect to those illustrated here, purely by way of non-limiting example, with reference to the attached drawings, without departing from the scope of the invention.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

| LIST OF REFERENCE SIGNS | |
|---|---|
| Supply node | +V |
| Output node | +Out |
| Electronic switches | MOS1, MOS2 |
| Drive node | A |
| Transformer | T |
| Primary winding | Wp |
| Secondary winding | Ws1, Ws2 |
| Center tap node | B |
| Inductive component | 10 |
| Winding halves | Li1, Li2 |
| Center tap node | C |
| Capacitance coupling | Ci1, Cs1 |
| Diode clamping arrangement | Di1, Di2 |
| Resistor | Rs1 |
| Capacitor | Cs1 |
| Supply voltage | $V_{in}$ |
| Inductor | Lr |
| Inductor | Lm |
| Signal | Vc |

What is claimed is:

1. A converter circuit, comprising:
   at least two input nodes;
   an output comprising an output node and ground;
   a half-bridge arrangement coupled to the at least two input nodes, wherein the half-bridge arrangement includes a pair of electronic switches alternatively switchable between conductive and non-conductive states with a drive node therebetween;
   a transformer with
      a primary winding configured to be driven by the drive node, and
      a secondary winding including a first portion and a second portion with a center tap node directly connected to the output node of the converter circuit;
   a first output diode directly interposed between ground and the first portion of the secondary winding of the transformer;
   a second output diode directly interposed between ground and the second portion of the secondary winding of the transformer;
   an inductive component comprising two magnetically coupled winding halves with a respective center tap node, wherein the inductive component is coupled to ends of the secondary winding of the transformer with the respective center tap node coupled to the output node of the converter circuit; and
   a diode clamping arrangement comprising a series arrangement of two clamping diodes between the output node of the converter circuit and ground with an intermediate node between the two clamping diodes coupled to the respective center tap node of the inductive component.

2. The converter circuit of claim 1, wherein the respective center tap node of the inductive component is capacitively coupled to the output node of the converter circuit.

3. The converter circuit of claim 1, wherein the intermediate node between the two clamping diodes is capacitively coupled to the respective center tap node of the inductive component.

4. The converter of claim 1,
   wherein an anode of the first output diode is connected to ground and a cathode of the first output diode is connected to the secondary winding of the transformer, and
   wherein an anode of the second output diode is connected to ground and a cathode of the second output diode is connected to the secondary winding of the transformer.

5. The converter circuit of claim 1, further comprising an RC network between the respective center tap node of the inductive component and the output node of the converter circuit.

6. The converter circuit of claim 5, wherein the RC network comprises a resistor and a capacitor arranged in series.

7. A method comprising:
   providing a converter circuit with:
   at least two input nodes;
   an output comprising an output node and ground;
   a half-bridge arrangement coupled to the at least two input nodes,
      wherein the half-bridge arrangement includes a pair of electronic switches alternatively switchable between conductive and non-conductive states with a drive node therebetween;
   a transformer with a primary winding configured to be driven by the drive node, and
a secondary winding including a first portion and a second portion with a center tap node directly connected to the output node of the converter circuit;
a first output diode directly interposed between ground and the first portion of the secondary winding of the transformer;
a second output diode directly interposed between ground and the second portion of the secondary winding of the transformer;
an inductive component comprising two magnetically coupled winding halves with a respective center tap node, wherein the inductive component is coupled to ends of the secondary winding of the transformer with the respective center tap node coupled to the output node of the converter circuit; and
a diode clamping arrangement comprising a series arrangement of two clamping diodes between the output node of the converter circuit and ground with an intermediate node between the two clamping diodes coupled to the respective center tap node of the inductive component.

8. A converter circuit, comprising:
a supply node;
an output comprising an output node and ground;
a half-bridge arrangement coupled to the supply node, wherein the half-bridge arrangement includes a pair of electronic switches alternatively switchable between conductive and non-conductive states with a drive node therebetween;
a transformer with
a primary winding configured to be driven by the drive node, and
a secondary winding including two portions with a center tap node connected to the output node of the converter circuit;
a dispersed inductance comprising two winding halves coupled to ends of the secondary winding of the transformer;
an inductive component comprising two magnetically coupled winding halves with a respective center tap node coupled to the output node of the converter circuit, wherein the inductive component is coupled to ends of the dispersed inductance; and
a diode clamping arrangement comprising a series arrangement of two clamping diodes between the output node of the converter circuit and ground with an intermediate node between the two clamping diodes coupled to the respective center tap node of the inductive component.

9. The converter circuit of claim 8, wherein the inductive component is arranged in parallel with the secondary winding of the transformer.

10. The converter circuit of claim 8, wherein the two magnetically coupled winding halves are arranged in series with each other with the respective center tap node arranged between the magnetically coupled winding halves.

11. The converter circuit of claim 8, further comprising an RC network between the respective center tap node of the inductive component and the output node of the converter circuit.

12. The converter circuit of claim 11, wherein the RC network comprises a resistor and a capacitor arranged in series.

* * * * *